Figure 1:
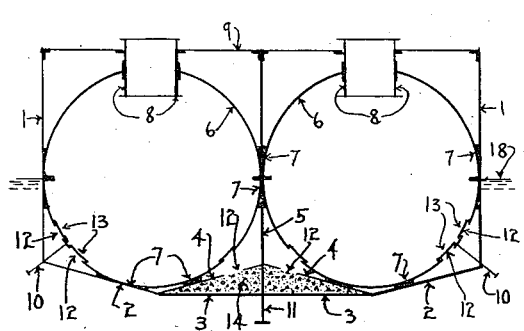

Feb. 18, 1936.  H. M. KNIGHT  2,030,881

VESSEL

Filed Aug. 23, 1933    4 Sheets-Sheet 1

INVENTOR
HERBERT M. KNIGHT
BY
Howard P. King
ATTORNEY

Feb. 18, 1936.   H. M. KNIGHT   2,030,881
VESSEL
Filed Aug. 28, 1933   4 Sheets-Sheet 2

INVENTOR
HERBERT M. KNIGHT
BY
Howard P. King
ATTORNEY

Feb. 18, 1936.                H. M. KNIGHT                2,030,881
                                 VESSEL
                          Filed Aug. 28, 1933         4 Sheets-Sheet 3

INVENTOR
HERBERT M. KNIGHT
BY
Howard P. King
ATTORNEY

Feb. 18, 1936.   H. M. KNIGHT   2,030,881
VESSEL
Filed Aug. 28, 1933   4 Sheets-Sheet 4

INVENTOR
HERBERT M. KNIGHT
BY
Howard P. King
ATTORNEY

Patented Feb. 18, 1936

2,030,881

UNITED STATES PATENT OFFICE 2,030,881

VESSEL

Herbert M. Knight, Montclair, N. J.

Application August 28, 1933, Serial No. 687,209

8 Claims. (Cl. 114—79)

This invention relates to vessels, and especially to vessels composed of an outer skin and an inner shell, the said skin and the said shell being united at their points of contact.

One of the objects of this invention is the construction of a vessel having a central longitudinal bulkhead and having similar longitudinal shells on either side of said bulkhead, which, said shells, are connected both to the bulkhead and to the skin. Another object of the invention is the construction of a vessel so composed of a central longitudinal bulkhead connected to said curvilinear shells, in which the said bulkhead is extended beneath the bottom of the said skin as a fin keel. Still another object of the invention is the construction of a vessel having a central longitudinal bulkhead having curvilinear shells on both sides thereof, said shells resting upon and connected to inclined plates obliquely disposed relative to each other, and a bottom plate joining the lower angles of said obliquely disposed inner plates. Another object of the invention is the construction of such a vessel composed of a central longitudinal bulkhead, with curvilinear shells in duplicate, obliquely disposed inner plates, a bottom plate connecting the lower angles of said obliquely disposed plates and a permanent ballast resting upon said bottom plate and confined between said bottom and said oblique plates, thereby materially lowering the centre of gravity of said vessel. A further object of the invention is the construction of a vessel composed of inner shells, outer skin and central longitudinal bulkhead, with means of subdividing the holds within said shells into upper and lower holds, or decks, with removable and returnable floors or openings in connection with such subdivision. Still a further object of the invention is the construction of a vessel composed of inner shells, outer skin and central longitudinal bulkhead, with a false bottom which is raiseable and lowerable. Still other purposes of the invention will appear from this description and from the accompanying plans.

I illustrate my invention by the accompanying drawings which indicate the usual and preferred embodiment of the same. While these drawings do so illustrate the preferred embodiment of the invention, they are not to be considered as including all of the ways in which the invention may be applied, nor as excluding other applications of the invention not thereby specifically indicated.

Figure 3:
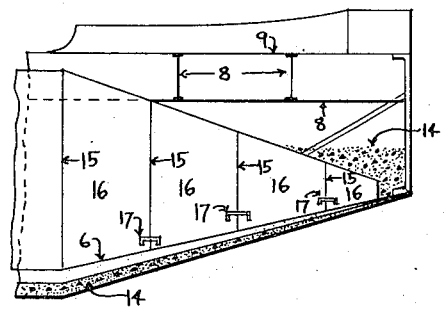
Figure 2:
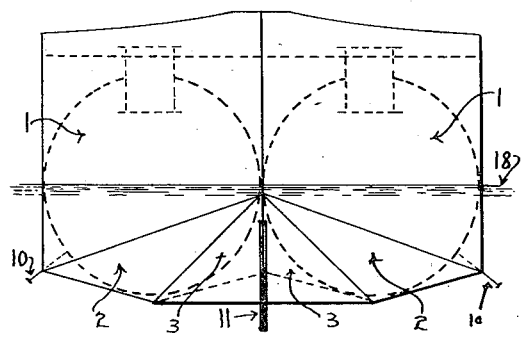
Figure 4:
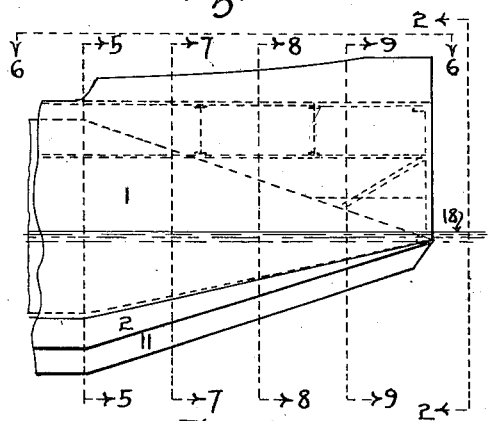
Figure 5:
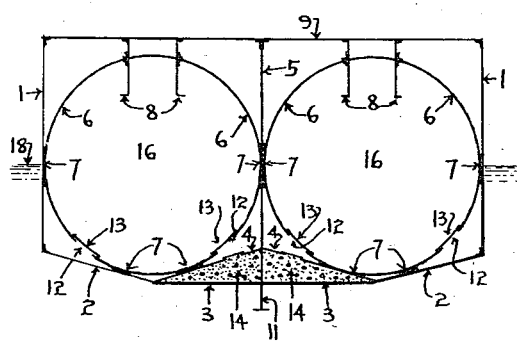
Figure 6:
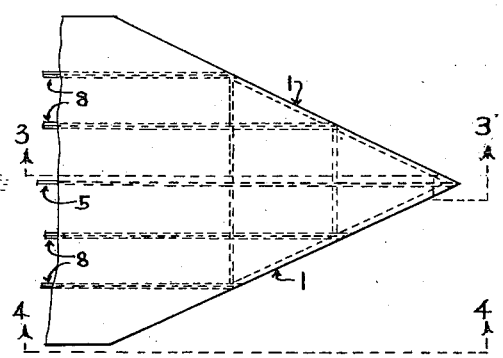
Figure 7:
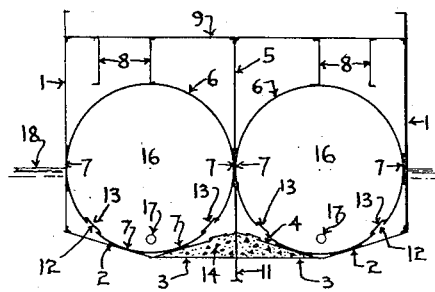
Figure 8:
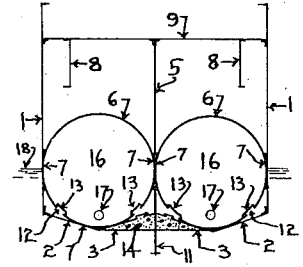
Figure 9:
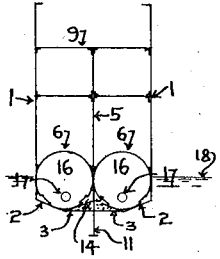
Figure 10:
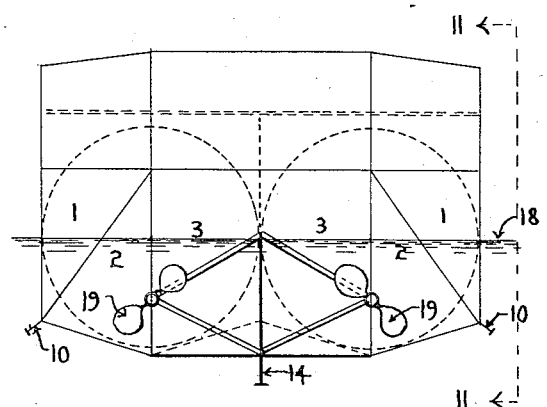
Figure 11:
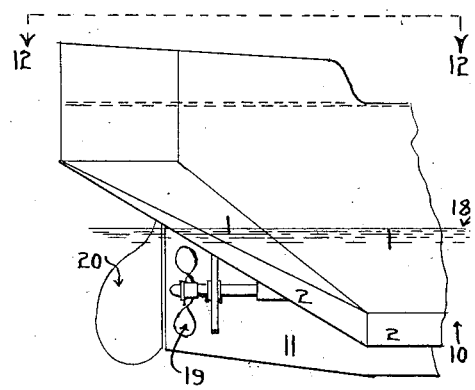
Figure 12:
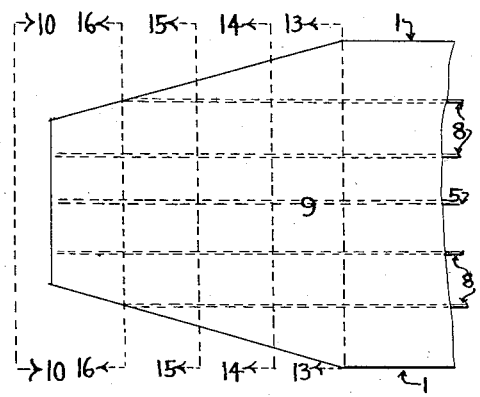
Figure 13:
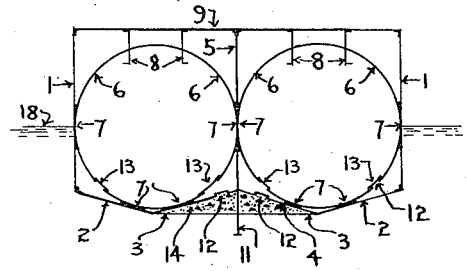
Figure 14:
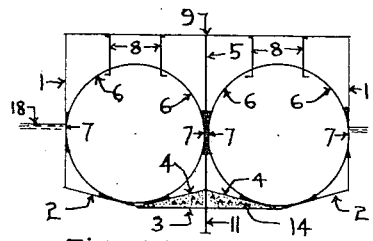
Figure 15:
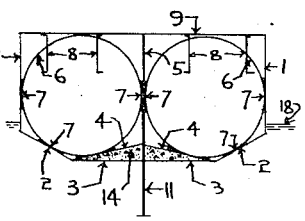
Figure 16:
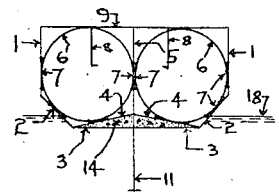
Figure 17:
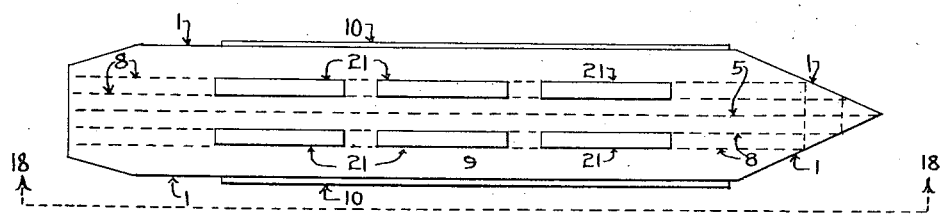
Figure 18:
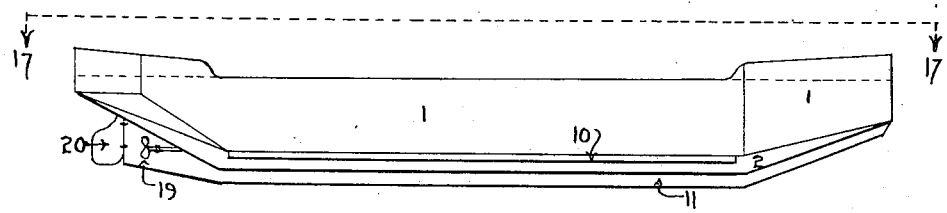
Figure 19:
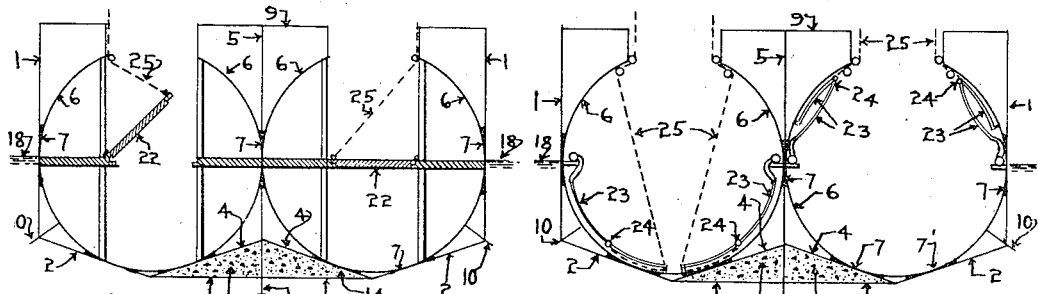
Figure 20:
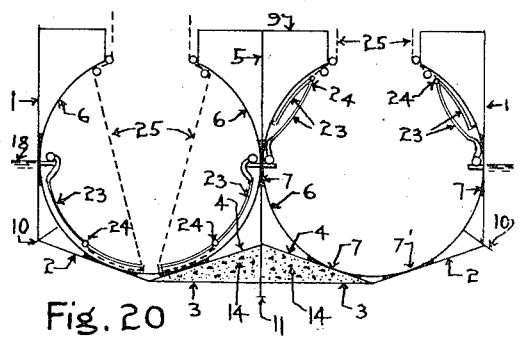
Figure 21:
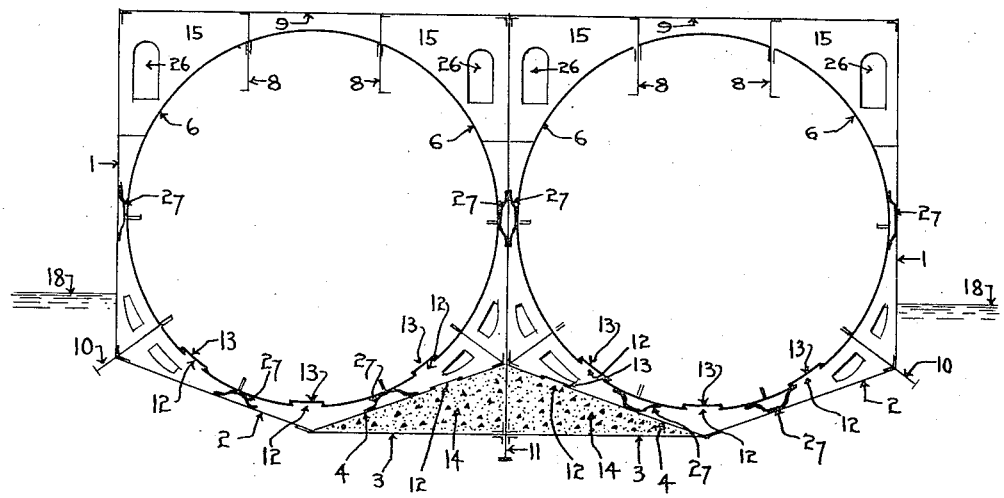
Figure 22:
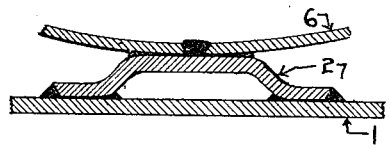
Figure 23:
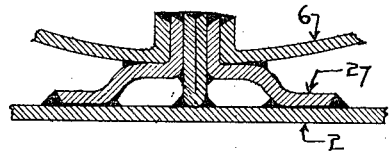
Figure 24:
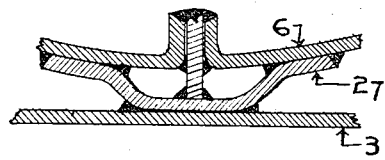
Figure 25:
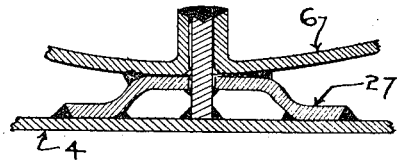

Fig. 1 is a mid-ship section of such a vessel; Fig. 2 is a prow elevation on the line 2—2 of Fig. 4; Fig. 3 is a vertical section of the prow on the line 3—3 of Fig. 6; Fig. 4 is a vertical elevation of the prow section on the line 4—4 of Fig. 6; Fig. 5 is a vertical cross-section on the line 5—5 of Fig. 4; Fig. 6 is a horizontal view on the line 6—6 of Fig. 4; Fig. 7 is a vertical cross-section on the line 7—7 of Fig. 4; Fig. 8 is a vertical cross-section on the line 8—8 of Fig. 4; Fig. 9 is a vertical cross-section on the line 9—9 of Fig. 4; Fig. 10 is an elevation of the stern on the line 10—10 of Fig. 12; Fig. 11 is a vertical side elevation on the line 11—11 of Fig. 10; Fig. 12 is a horizontal view of the stern on the line 12—12 of Fig. 11; Fig. 13 is a vertical cross-section on the line 13—13 of Fig. 12; Fig. 14 is a vertical cross-section on the line 14—14 of Fig. 12; Fig. 15 is a vertical cross-section on the line 15—15 of Fig. 12; Fig. 16 is a vertical cross-section on the line 16—16 of Fig. 12; Fig. 17 is a horizontal view of such a vessel on the line 17—17 of Fig. 18; Fig. 18 is a side elevation on the line 18—18 of Fig. 17; Fig. 19 is a cross-section showing the trap-floor device; Fig. 20 is a cross-section showing the raiseable and lowerable false bottom; Fig. 21 is a mid-section of such vessel, showing the use of saddle-bar connections and Figs. 22, 23, 24 and 25 indicate different forms of saddle-bar connection.

Referring to the accompanying drawings, in which similar figures refer to similar parts:—1, are upper strakes, 2, are lower strakes, 3, are bottom outer plates, 4, are interior plates, 5, is a longitudinal bulkhead, 6, are inner shells, 7, are connecting means, 8, are upper longitudinal girders, 9, is a deck, 10, are bilge-keels, 11, is a fin-keel, 12, are access holes, 13, are cover plates, 14, is a permanent ballast, 15, are cross-bulkheads, 16, are trim-tanks, 17, are tank connecting means, 18, is the water surface, 19, are propelling means, 20, is a rudder, 21, are hatches, 22, are hatch floor openings, 23, are false bottoms, 24, are joints in said bottoms, 25, are raising and lowering means, 26, are openings in cross bulkheads and 27, are saddle-bars.

Vessels, as usually constructed, consist of a series of ribs or frames, spaced at varying distances apart longitudinally throughout the length of the vessel, these frames being bent into the shape which it is desired the vessel shall present when fully completed, and an outer covering, or skin, which is composed of a series of plates which are riveted to each other and to the aforesaid frames. This construction is one demanding great skill on the part of the workmen whose task it is to bend the frames to their exact form, and also to mold the plates, so that the lines thereof shall closely fit the previously bent frames. Again, the cost of this type of construction, both in money and in time, is very large, due to the infinite variation of the many ribs and frames, and also of the various strakes which make up the outer plating, or skin.

This invention obviates these important and costly defects by substituting for the frames, a continuous inner shell of the same form and dimension throughout the greater part of the length, or mid-section, of the vessel, and, without modification of the essential design, but simply by a change in diameter, continues this shell, which is curvilinear in form, to both stem and stern.

This type of construction has heretofore been promulgated, particularly in applicant's application for Letters Patent Serial Number 549,138, but this application is an improvement upon the earlier offering in the fields of economy of construction, strength and stability.

In earlier designs the combination of an inner curvilinear shell and an outer plane skin has largely, if not exclusively been confined to a single curvilinear shell located within and contact connected with an outer skin, without any central longitudinal bulkhead. In cases where such central bulkhead is a portion of the design, the bottom of the vessel is composed of a plurality of obliquely disposed bottom plates, none of which are interconnected. The design of a single shell offers advantages in the way of simplicity and economy of construction, and, in addition, provides areas in which a permanent ballast can be located, but, on account of the relative location of such areas, it is not possible to so locate such permanent ballast at its lowest point, or point of greatest efficiency.

The improved construction offers distinct advantages, in that it adds a central bulkhead, said bulkhead extending to or beyond the bottom plate, or plates, which said bottom plate, or plates, interconnects the several oblique plates, upon which the several curvilinear shells rest, and to which they are connected, and, at the same time, unites them to the central longitudinal bulkhead. This construction is one of great strength, the entire vessel structure acting as a girder, in which all parts act together to resist stresses tending to shear the vessel.

The introduction of this bottom plate, so interconnecting the obliquely disposed inner plates as to make them a unit, also provides two large areas on either side of the central bulkhead, these areas being at the very lowest part of the vessel. A permanent ballast of relatively heavy consistency being located within these areas and in contact with the said bottom plates, lowers the centre of gravity of the vessel and at the same time raises the centre of buoyancy, thereby materially improving the stability of the vessel.

In addition to this improvement in stability, and in addition to the increase in strength secured through the use of the multiple inner shells directly connected to the longitudinal central bulkhead, the design is still further improved by the introduction of longitudinal deck girders of increased depth.

Furthermore, and in addition to the beneficial effects above recited, the operation of the vessel is still further benefited by extending the aforesaid longitudinal central bulkhead below the aforesaid bottom plates to form a fin keel. Such a keel acts to prevent "drift", thereby very materially assisting the vessel in maintaining its course and becomes a valuable adjunct in the navigation of the vessel. This same bulkhead and fin keel, extended beyond the after perpendicular, becomes a means for the attachment of multiple screws, providing a rigid outboard supporting means for the shaft housing.

The use of such multiple shell interior framing reduces the span of the hold decks. It thereby becomes possible, through the use of lifting and lowering appliances, to introduce trap-floors within the holds, thereby utilizing the entire cargo space, without loss because of hatch openings between decks.

In the carrying of cargoes of different characters it often becomes important to be able to quickly and economically introduce a false bottom upon which one class of commodity may be deposited, which false bottom may be removed immediately if another kind of cargo is to be quickly loaded, as say, grain and iron-ore, which are to be consecutively, or even conjointly, carried in the same voyage, without time for intermediate cleaning of the holds. It is desirable that two such unrelated commodities should be definitely separated, which is accomplished in this invention by a system of false bottoms, articulated so as to fold upon themselves, and which, by means of a single haul, can be both so folded and raised, as to bring the entire false bottom to, and retain it at, a high position, thus leaving the interior shell free as a supporting means for a cargo of one character, the false bottom, when such cargo shall have been discharged, being lowered to its lowest position where it rests upon the shell, such false bottom then becoming the supporting or holding means of the cargo of a different character.

In addition to its other advantages the curvilinear inner frame type of construction provides an ideal means for the storage of fuel. The spaces automatically produced between the skin, the shell and the deck, particularly those spaces or parts of spaces near the stern, become the logical location for bunkers for the storage of fuel, either solid or liquid, from whence it will flow by gravity easily and directly to the points of consumption in engine room or boiler room.

Again the construction of this type of vessel provides on either side of the longitudinal bulkhead, and beneath the deck, space longitudinal of the vessel. This space, on either or both sides of said bulkhead, is usable either as bunk space or as a passageway from stem to stern.

The fore-peak, or bow portion, of such a vessel, offers very little opportunity for cargo space. Again, due to the cutting away of the fore-foot in order to provide a better entrance, and to reduce bow-wave and other undesirable features, the prow of such a vessel will be materially lighter than the stern, with its load of machinery, stores, etc., especially when the vessel is running light. In order to overcome this condition and to provide a means of maintaining an even keel, the prow section is provided with a multiple of "trim-tanks", so called, which are filled with water ballast to any desired or required height, in order to secure the proper fore and aft trim. These tanks are inter-connected so that any desired rate of flow as between the several tanks can be secured. The trim-tanks on opposite sides of the central longitudinal bulkhead are distinct and usually separated, thus permitting any relative difference in the water elevation of these tanks on either side of said bulkhead, this ability to produce and to control such difference in elevation of such water ballast, assisting in the control of the transverse trim of the vessel.

What I claim is:—

1. In a vessel, the combination of an interior longitudinal, vertical bulkhead, exterior substantially vertical upper strakes, lower strakes obliquely disposed with reference to said upper strakes, said upper and said lower strakes having lines of contact, means rigidly connecting said strakes at said lines, inner bottom plates obliquely disposed with reference to said bulkhead and to said lower strakes, said plates having lines of contact with said bulkhead above the bottom of the vessel and also with said lower strakes, means rigidly connecting said inner plates and said bulkhead at said contact lines, other means rigidly connecting said inner plates and said lower strakes at their said contact lines, a plurality of inner shells, each said shell being curvilinear in a plane normal to the longitudinal axis of said vessel and in tangential contact with the bulkhead at one side and with an upper strake at its other side and resting upon and in tangential contact at its bottom with the one lower strake and with one of said inner plates, and means connecting said bulkhead strakes and plates with the said inner shell at the several said tangential points of contact therewith, said shells functioning as continuous frames and cooperating with the bulkhead strakes and plates to obtain a reenforced girder-like unitary structure.

2. In a vessel, the combination of an interior longitudinal, vertical bulkhead, exterior substantially vertical upper strakes, lower strakes obliquely disposed with reference to said upper strakes, said upper and said lower strakes having lines of contact, means rigidly connecting said strakes at said lines, substantially horizontal outer bottom plates having lines of contact with said lower strakes and having a middle line of contact with a lower part of said bulkhead, inner bottom plates obliquely disposed with reference to the bulkhead and said outer bottom plates as well as with respect to said lower strakes and having lines of contact with said bulkhead, outer bottom plates and lower strakes, means rigidly connecting said inner plates with said bulkhead, outer bottom plates and lower strakes at said contact line, a plurality of inner shells, each said shell being curvilinear in a plane normal to the longitudinal axis of said vessel, and in tangential contact with the bulkhead at one side and with an upper strake at its other side and resting upon and in tangential contact at its bottom with the one lower strake and with one of said inner plates, and means connecting said bulkhead strakes and plates with the said inner shell at the several said tangential points of contact therewith, said shells functioning as continuous frames and cooperating with the bulkhead strakes and plates to obtain a reenforced girder-like unitary structure.

3. In a vessel, the combination of an interior longitudinal, vertical bulkhead, exterior substantially vertical upper strakes, lower strakes obliquely disposed with reference to said upper strakes, said upper and said lower strakes having lines of contact, means rigidly connecting said strakes at said lines, substantially horizontal outer bottom plates having lines of contact with said lower strakes, and having a middle line of contact with a lower part of said bulkhead, inner bottom plates obliquely disposed with reference to the bulkhead and said outer bottom plates as well as with respect to said lower strakes and having lines of contact with said bulkhead, outer bottom plates and lower strakes, means rigidly connecting said inner plates with said bulkhead, outer bottom plates and lower strakes at said contact line, a plurality of inner shells, each said shell being curvilinear in a plane normal to the longitudinal axis of said vessel, and in tangential contact with the bulkhead at one side and with an upper strake at its other side and resting upon and in tangential contact at its bottom with the one lower strake and with one of said inner plates, and means connecting said bulkhead strakes and plates with the said inner shell at the several said tangential points of contact therewith, said shells functioning as continuous frames and cooperating with the bulkhead strakes and plates to obtain a reenforced girder-like unitary structure, and a permanent ballast resting upon said horizontal outer bottom plates and beneath said inner bottom plates.

4. In a vessel, the combination of an interior longitudinal, vertical bulkhead, exterior substantially vertical upper strakes, lower strakes obliquely disposed with reference to said upper strakes, said upper and said lower strakes having lines of contact, means rigidly connecting said strakes at said lines, substantially horizontal outer bottom plates having lines of contact with said lower strakes and having a middle line of contact with a lower part of said bulkhead, inner bottom plates obliquely disposed with reference to the bulkhead and said outer bottom plates as well as with respect to said lower strakes and having lines of contact with said bulkhead, outer bottom plates and lower strakes, means rigidly connecting said inner plates with said bulkhead, outer bottom plates and lower strakes at said contact line, a plurality of inner shells, each said shell being curvilinear in a plane normal to the longitudinal axis of said vessel, and in tangential contact with the bulkhead at one side and with an upper strake at its other side and resting upon and in tangential contact at its bottom with the one lower strake and with one of said inner plates, and means connecting said bulkhead strakes and plates with the said inner shell at the several said tangential points of contact therewith, said shells functioning as continuous frames and cooperating with the bulkhead strakes and plates to obtain a reenforced girder-like unitary structure, and a fin keel beneath said outer bottom plate, said keel being an extension of said bulkhead.

5. In a vessel, the combination of an interior longitudinal, vertical bulkhead, exterior substantially vertical upper strakes, lower strakes obliquely disposed with reference to said upper strakes, said upper and said lower strakes having lines of contact, means rigidly connecting said strakes at said lines, substantially horizontal outer bottom plates having lines of contact with said lower strakes and having a middle line of contact with a lower part of said bulkhead, inner bottom plates obliquely disposed with reference to the bulkhead and said outer bottom plates as well as with respect to said lower strakes and having lines of contact with said bulkhead, outer bottom plates and lower strakes, means rigidly connecting said inner plates with said bulkhead, outer bottom plates and lower strakes at said contact line, a plurality of inner shells, each said shell being curvilinear in a plane normal to the longitudinal axis of said vessel, and in tangential contact with the bulkhead at one side and with an upper strake at its other side and resting upon and in tangential contact at its bottom with the one lower strake and with one of said inner plates, and means connecting said bulkhead strakes and plates with the said inner shell at the several said tangential points of contact therewith, said shells functioning as continuous frames and cooperating with the bulkhead strakes and plates to obtain a reenforced girder-like unitary structure, bilge keels exterior of and at the junction between said upper and lower strakes, and means rigidly connecting said keels to said strakes, and other means rigidly connecting said keels to said shells.

6. In a vessel, the combination of an interior longitudinal, vertical bulkhead, exterior substantially vertical upper strakes, lower strakes obliquely disposed with reference to said upper strakes, said upper and said lower strakes having lines of contact, means rigidly connecting said strakes at said lines, substantially horizontal outer bottom plates having lines of contact with said lower strakes and having a middle line of contact with a lower part of said bulkhead, inner bottom plates obliquely disposed with reference to the bulkhead and said outer bottom plates as well as with respect to said lower strakes and having lines of contact with said bulkhead, outer bottom plates and lower strakes, means rigidly connecting said inner plates with said bulkhead, outer bottom plates and lower strakes at said contact line, a plurality of inner shells, each said shell being curvilinear in a plane normal to the longitudinal axis of said vessel, and in tangential contact with the bulkhead at one side and with an upper strake at its other side and resting upon and in tangential contact at its bottom with the one lower strake and with one of said inner plates, and means connecting said bulkhead strakes and plates with the said inner shell at the several said tangential points of contact therewith, said shells functioning as continuous frames and cooperating with the bulkhead strakes and plates to obtain a reenforced girder-like unitary structure, a permanent ballast resting upon said outer bottom plates and beneath said inner bottom plates, a fin keel projecting laterally from the side of the vessel and a bilge keel projecting downwardly from the bottom of the vessel.

7. In a vessel, the combination of an interior longitudinal, vertical bulkhead, exterior substantially vertical upper strakes, lower strakes obliquely disposed with reference to said upper strakes, said upper and said lower strakes having lines of contact, means rigidly connecting said strakes at said lines, substantially horizontal outer bottom plates having lines of contact with said lower strakes and having a middle line of contact with a lower part of said bulkhead, inner bottom plates obliquely disposed with reference to the bulkhead and said outer bottom plates as well as with respect to said lower strakes and having lines of contact with said bulkhead, outer bottom plates and lower strakes, means rigidly connecting said inner plates with said bulkhead, outer bottom plates and lower strakes at said contact line, a plurality of inner shells, each said shell being curvilinear in a plane normal to the longitudinal axis of said vessel, and in tangential contact with the bulkhead at one side and with an upper strake at its other side and resting upon and in tangential contact at its bottom with the one lower strake and with one of said inner plates, and means connecting said bulkhead strakes and plates with the said inner shell at the several said tangential points of contact therewith, said shells functioning as continuous frames and cooperating with the bulkhead strakes and plates to obtain a reenforced girder-like unitary structure, a prow section, terminating the forward ends of the upper and lower strakes inner and outer bottom plates and shells, and cross bulkheads in said prow section.

8. In a vessel of the type described, the combination of a vertical longitudinal bulkhead in said vessel, upper and lower strakes joined at their longitudinal meeting edges and forming the exterior sides of the vessel, a plurality of inner shells, said shells being curvilinear in a plane normal to the longitudinal axis of said vessel, inner plates extending between said bulkhead and said lower strakes inclined with respect to each, said shells each having lines of contact with said bulkhead and with one of said inner plates and with one of said upper and lower strakes, and means rigidly connecting said shells at the several lines of contact with the bulkhead, plates and strakes, thereby uniting the said shells, bulkhead, plates and strakes as a reenforced girder-like unitary structure.

HERBERT M. KNIGHT.